C. F. GREGORY.
ANGULAR VALVE OF THE ROTATING TYPE.
APPLICATION FILED JUNE 15, 1915.
1,187,987. Patented June 20, 1916.
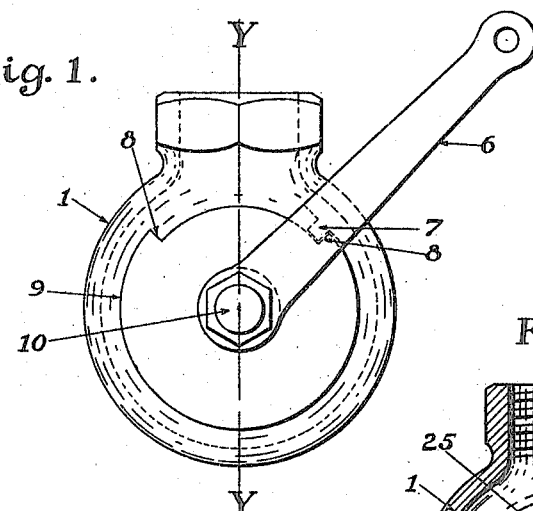
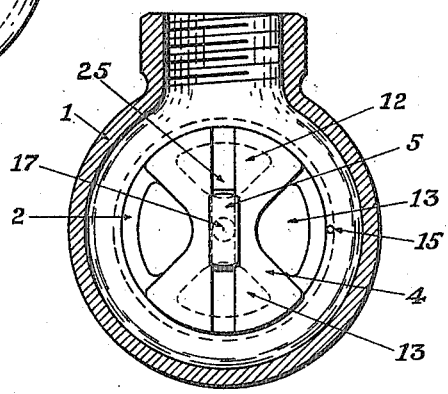
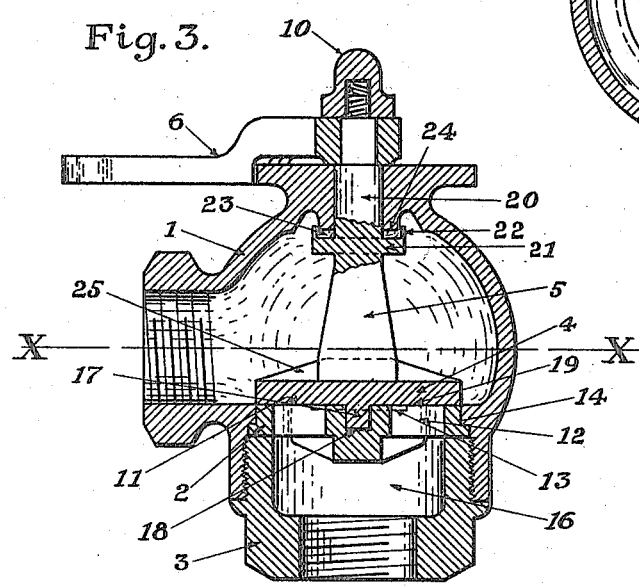

UNITED STATES PATENT OFFICE.

CHARLES FREDRICK GREGORY, OF ST. LOUIS, MISSOURI, ASSIGNOR TO GREGORY SUPPLY AND MANUFACTURING COMPANY, OF ST. LOUIS, MISSOURI.

ANGULAR VALVE OF THE ROTATING TYPE.

1,187,987.    Specification of Letters Patent.    Patented June 20, 1916.

Application filed June 15, 1915. Serial No. 34,195.

*To all whom it may concern:*

Be it known that I, CHARLES FREDRICK GREGORY, a citizen of the United States, residing at St. Louis city, State of Missouri, have invented certain new and useful Improvements in Angular Valves of the Rotating Type, of which the following is a specification, reference being had therein to the accompanying drawings.

The invention relates to quick-opening valves, and particularly to the angular, rotating type valve.

The invention has for its principal purposes: the free and easy passage by means of a quick operating handle; the simplification of the construction of valves of this type; the structure of a valve having a body made of an integral casting, dispensing with the caps or bodies made up of two or more parts usually employed in erecting a valve of this type; to provide a removable valve seat held in position by a bonnet which also serves as a pipe connection; to provide for the expeditious and simple removal of valve seat, rotating valve, and valve stem by the removal of the bonnet; to provide an improved valve stem constructed to make a tight joint between valve stem and the body; to provide an operating handle with means of limiting the operation of the valve.

The invention is illustrated in the accompanying drawings, but it is to be understood that slight changes and modifications can be made without departing from the nature and principle thereof.

Detailed embodiments of the invention are illustrated in the accompanying drawings, wherein—

Figure One (1) is a plan view of the top of the valve. Fig. Two (2) is a cross or transverse section of valve on the line "X X" of Fig. Three (3), showing arrangement of valve seat, rotating valve, and valve stem. Fig. Three (3) is a longitudinal section of valve on the line "Y Y" of Fig. One (1).

Similar numbers refer to similar parts throughout the several views.

Referring to the drawings, one (1) is the valve body, preferably made in the form of an integral casting providing an angular passage as shown; two (2) is the valve seat secured in the body one (1); three (3) is the bonnet threaded into lower passage of body one (1); four (4) is the rotating valve rotating on valve seat two (2); five (5) is the valve stem operating rotating valve four (4); six (6) is the operating handle fitted on squared end of valve stem five (5) and provided with lug seven (7) adapted to engage in indentations in quadrant ring nine (9) on body one (1) when valve is in extreme positions; ten (10) is a cap nut on end of valve stem five (5) to hold operating handle six (6) in position.

The valve seat two (2) has a circular ground face eleven (11) in the confines of which are ports or orifices twelve (12) and recesses thirteen (13), and is held in recess fourteen (14) of body one (1) by bonnet three (3), adjustment being secured by means of pin fifteen (15) in outer edge of valve seat two (2). The ports of recesses 13 are provided within the seat to make provision for the collection and deposit within the valve of the sediment or mud which will accumulate on the valve seat and valve disk. When the valve ports are closed and the steam shut off, it is apparent that most of the sediment will fall back upon the seat, this sediment being housed within the recesses in the upper face of the seat and retained there, preventing the wearing or grinding of the valve and valve seat. When the steam, fluid or gas is turned on the recesses will, of course, be cleaned and in this way protect the valve seat and the valve. It is also particularly desirable to have the valve of the particular shape illustrated in the drawings, in that in this construction it is not necessary to provide ports therethrough, the reduced intermediate portion when the valve is in the proper position allowing the passage of the steam through the ports in the valve seat.

The bonnet three (3) is made of such a diameter at threaded end that when removed it will permit of the expeditious and simple removal of the operating parts, viz., valve seat 2, rotating valve 4, and valve stem 5, so that these parts may be refitted without removing the body 1 from its connected position. It is also (3) provided with concentrating and diffusing chamber sixteen (16) into which ports or orifices 11 deliver.

Rotating valve 4 is held in position by circular projection seventeen (17) which enters recess eighteen (18) of valve seat (2), thus allowing ground face nineteen (19) of rotating valve 4 to rotate on ground face 11 of valve seat 2.

Valve stem 5 is supported at its upper end in bearing twenty (20) in body 1, and is provided with a collar twenty-one (21) and flange twenty-two (22) so arranged that a suitable packing twenty-three may be inserted between the collar 21 and surface twenty-four (24) of body 1. A tight joint is secured between collar 21 and surface 24 by the pressure exerted on under side of collar 21, causing valve stem 5 to be thrust endwise. The lower end of valve stem 5 is made of rectangular shape, and engages in slot twenty-five (25) of rotating valve 4 in such a manner that in operating the valve stem 5, rotating valve 4 is rotated on valve seat 2.

Having thus described my invention and illustrated its use, what I claim as new and desire to secure by Letters-Patent is the following:

A valve comprising a body of single piece formation having a passage passing therethrough, a valve seat having suitable ports supported within the casing and having in its face exposed recesses adapted to be exposed at all times when the ports passing through the seat are closed, a valve supported on the seat having relatively wide end portions gradually diminishing in width toward the center to produce a small intermediate portion, the said valve when the ports passing through the seat are closed by the relatively wide end portions adapted to leave the recesses in the face exposed for the collection of sediment, a stem for actuating the valve, a flange carried by the stem and having a pocket therein, a packing arranged within the pocket and engaging an annular shoulder depending from the casing, and an operating handle connected with the stem for actuating the valve.

In testimony whereof I have hereunto signed my name in the presence of the two subscribed witnesses.

CHARLES FREDRICK GREGORY.

Witnesses:
PHILIP MARSH,
HOLLIS MARSH.

Copies of this patent may be obtained for five cents each, by addressing the "Commissioner of Patents, Washington, D. C."